US010854924B2

(12) United States Patent
Pyo et al.

(10) Patent No.: US 10,854,924 B2
(45) Date of Patent: Dec. 1, 2020

(54) ELECTRODE ASSEMBLY AND METHOD FOR MANUFACTURING THE SAME

(71) Applicant: LG Chem, Ltd., Seoul (KR)

(72) Inventors: Jung Kwan Pyo, Daejeon (KR); Sung Jong Kim, Daejeon (KR); Sang Hyun Koo, Daejeon (KR); Soo Ryoung Kim, Daejeon (KR); Cha Hun Ku, Daejeon (KR); Sung Min Hwang, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/072,401

(22) PCT Filed: Sep. 4, 2017

(86) PCT No.: PCT/KR2017/009659
§ 371 (c)(1),
(2) Date: Jul. 24, 2018

(87) PCT Pub. No.: WO2018/066820
PCT Pub. Date: Apr. 12, 2018

(65) Prior Publication Data
US 2020/0127334 A1 Apr. 23, 2020

(30) Foreign Application Priority Data
Oct. 5, 2016 (KR) .................. 10-2016-0128583

(51) Int. Cl.
*H01M 10/0583* (2010.01)
*H01M 2/16* (2006.01)
*H01M 10/04* (2006.01)

(52) U.S. Cl.
CPC ..... *H01M 10/0583* (2013.01); *H01M 2/1673* (2013.01); *H01M 10/0459* (2013.01); *H01M 10/0468* (2013.01)

(58) Field of Classification Search
None
See application file for complete search history.

(56) References Cited

U.S. PATENT DOCUMENTS

2010/0319187 A1* 12/2010 Kim .................. H01M 10/0583
29/623.1
2011/0104572 A1 5/2011 Ahn et al.
(Continued)

FOREIGN PATENT DOCUMENTS

CN 103797636 A 5/2014
CN 104798240 A 7/2015
(Continued)

OTHER PUBLICATIONS

Search report from International Application No. PCT/KR2017/009659, dated Dec. 12, 2017.
(Continued)

*Primary Examiner* — Magali P Slawski
(74) *Attorney, Agent, or Firm* — Lerner, David, Littenberg, Krumholz & Mentlik, LLP

(57) ABSTRACT

The present invention relates to an electrode assembly and a method for manufacturing the same, and more particularly, to an electrode assembly which is capable of improving an alignment of a secondary battery, realizing a high-capacity battery, and simplifying manufacturing processes of the secondary battery, and a method for manufacturing the same.

The electrode assembly includes an electrode stack in which a plurality of first electrodes spaced apart from each other are disposed between two separators and second electrodes attached to both outer surfaces of the electrode stack at alternate positions of a plurality of positions on which the
(Continued)

first electrodes are disposed, wherein, in the electrode stack, an area between the first electrode and the adjacent first electrode is folded.

16 Claims, 6 Drawing Sheets

(56) References Cited

U.S. PATENT DOCUMENTS

| | | | |
|---|---|---|---|
| 2011/0305938 A1* | 12/2011 | Yamamoto | H01M 10/0454 |
| | | | 429/144 |
| 2014/0087224 A1* | 3/2014 | Kim | H01M 2/266 |
| | | | 429/94 |
| 2014/0186685 A1* | 7/2014 | Kwon | H01M 2/18 |
| | | | 429/160 |
| 2015/0180082 A1* | 6/2015 | Jung | H01M 10/0431 |
| | | | 429/246 |
| 2015/0349382 A1 | 12/2015 | Kwon et al. | |
| 2015/0357671 A1 | 12/2015 | Park et al. | |

FOREIGN PATENT DOCUMENTS

| | | |
|---|---|---|
| CN | 104904054 A | 9/2015 |
| CN | 105393399 A | 3/2016 |
| KR | 20110048471 A | 5/2011 |
| KR | 20110135346 A | 12/2011 |
| KR | 20120117306 A | 10/2012 |
| KR | 20120118759 A | 10/2012 |
| KR | 20130131843 A | 12/2013 |
| KR | 20130135017 A | 12/2013 |
| KR | 20140128512 A | 11/2014 |

OTHER PUBLICATIONS

European Search report from EP Application No. 17 85 8615, dated Feb. 26, 2019.
Chinese Search Report for Application No. 201780009245.2, dated Sep. 2, 2020, pp. 1-3.

* cited by examiner

ELECTRODE ASSEMBLY AND METHOD FOR MANUFACTURING THE SAME

CROSS-REFERENCE TO RELATED APPLICATION

The present application is a national phase entry under 35 U.S.C. § 371 of International Application No. PCT/KR2017/009659 filed on Sep. 4, 2017, which claims priority from Korean Patent Application No. 10-2016-0128583, filed on Oct. 5, 2016, which are hereby incorporated by reference in their entirety.

TECHNICAL FIELD

The present invention relates to an electrode assembly and a method for manufacturing the same, and more particularly, to an electrode assembly which is capable of improving an alignment of a secondary battery, realizing a high-capacity battery, and simplifying manufacturing processes of the secondary battery, and a method for manufacturing the same.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Such a secondary battery may be configured so that an electrode assembly is built in a battery case. The electrode assembly mounted in the battery case is a chargeable/dischargeable power generating device having a structure in which a positive electrode/a separator/a negative electrode are stacked.

FIG. 1 is a cross-sectional view illustrating a process of manufacturing a stack and folding type electrode assembly in an electrode assembly according to the related art.

Referring to FIG. 1, a stack and folding type electrode assembly 11 has a structure in which a plurality of unit cells 10, in which a positive electrode 1, a separator 3, and a negative electrode 5 are sequentially stacked, are attached to a sheet type separator 9, and the sheet type separator 9 is folded in one direction L.

The stack and folding type electrode assembly 11 having the above-described structure has several problems.

First, in the stack and folding type electrode assembly 11 according to the related art, the positive electrode 1, the separator 3, and the negative electrode 5 are stacked and then cut into a radical unit to form an individual unit cell. Then, the unit cell 10 is attached to the sheet type separator 9 to perform a folding process. Thus, the process of manufacturing the electrode assembly may be complicated.

Also, in the process of manufacturing the unit cell 10, tolerances generated in each of the positive electrode 1, the negative electrode 5, and the separator 3 may be accumulated. Then, when the unit cell 10 is folded in the next process, a tolerance between the unit cells while the folding and the stacking may be accumulated again to significantly cause an overhang issue in which the positive electrode 1 is out of alignment of the negative electrode 5.

FIG. 2 is a cross-sectional view illustrating a stacked state of a lamination and stacking type electrode assembly. Referring to FIG. 2, in the lamination and stacking type electrode assembly 12, the unit cells 20, in which the positive electrode 1, the separator 3, the negative electrode 5, and the separator 3 are stacked, are aligned by an outer dimension of the separator 3. In this case, the overhang issue may also occur.

That is, the individual tolerances of the plurality of electrodes 1 and 5 and the plurality of separators 3 may be accumulated while manufacturing the unit cells 20, and the tolerance between the unit cells 20 may also be accumulated to cause the overhang issue in which the positive electrode 1 is out of the negative electrode 5. FIG. 2 illustrates an overhang area A that is an area in which the positive electrode 1 is out of the negative electrode.

Thus, various efforts have been made to solve the above-mentioned problems, for example, electrode assembly having various shapes have been developed.

DISCLOSURE OF THE INVENTION

Technical Problem

The present invention has been made to solve the above problems, an object of the prevent invention is to provide an electrode assembly, which is capable of minimizing an overhang issue in a secondary battery to improve alignment of the battery, realize the high-capacity battery, and more simplify manufacturing processes of the secondary battery, and a method for manufacturing the same.

Technical Solution

An electrode assembly according to the present invention includes an electrode stack in which a plurality of first electrodes spaced apart from each other are disposed between two separators and second electrodes attached to both outer surfaces of the electrode stack at alternate positions of a plurality of positions on which the first electrodes are disposed, wherein, in the electrode stack, an area between the first electrode and the adjacent first electrode is folded.

A method for manufacturing an electrode assembly according to the present invention includes a step of interposing first electrodes between two separators so that the first electrodes are spaced apart from each other to form an electrode stack, a step of stacking second electrodes on both outer surfaces of the electrode stack at alternate positions of a plurality of positions of the first electrodes, a step of bonding the separators, the first electrodes, and the second electrodes to each other by heat or a pressure, and a step of folding the electrode stack at an area between the first electrode and the adjacent first electrode.

Advantageous Effects

The electrode assembly according to the present invention may include the electrode stack in which the plurality of first electrodes that are spaced apart from each other are disposed between the two separators and the second electrodes attached to both outer surfaces of the electrode stack at alternate positions of the plurality of positions on which the first electrodes are disposed. In the electrode assembly, an area between the first electrode and the adjacent first electrode may be folded to minimize the overhang issue, thereby improving the alignment of the battery, and realizing the high-capacity battery, and simplifying the manufacturing process of the secondary battery.

The method for manufacturing the electrode assembly according to the present invention may include the step of interposing the first electrodes between the two separators so that the first electrodes are spaced apart from each other to form the electrode stack, the step of stacking the second electrodes on both the outer surfaces of the electrode stack at the alternate positions of the plurality of positions on which the first electrodes are disposed, the step of applying heat or a pressure to the separators and the first and second electrodes to be bonded to each other, and the step of folding the electrode stack on the area between the first electrode and the adjacent first electrode. Therefore, the electrode assembly according to the present invention may be produced.

MODE FOR CARRYING OUT THE INVENTION

Preferred embodiments of the present invention will be described below in more detail with reference to the accompanying drawings. However, the present invention is not limited to the embodiments below.

One Embodiment

Figure 1:
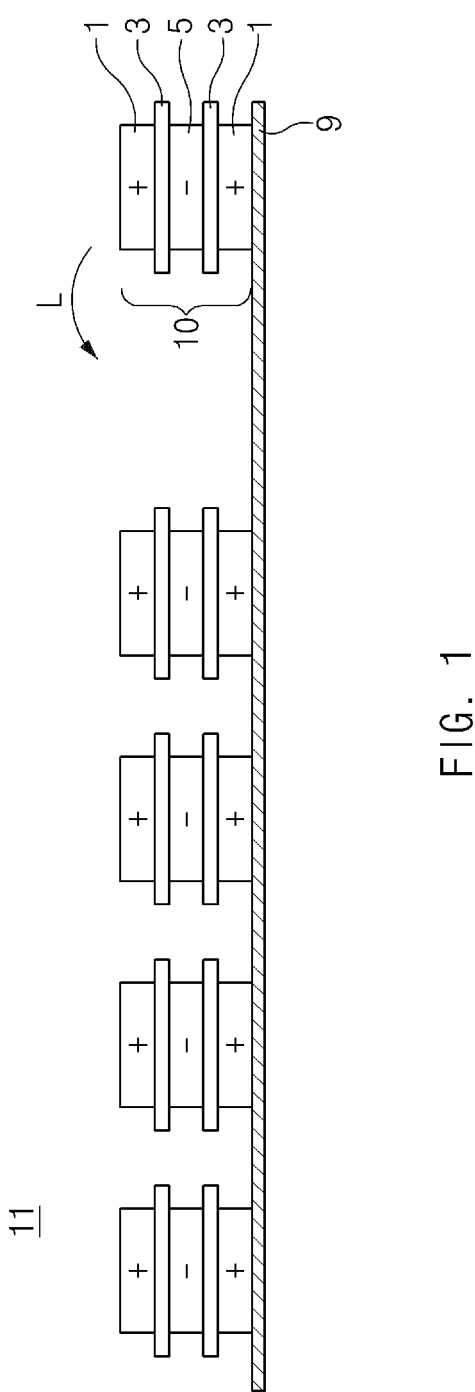
FIG. 1 is a cross-sectional view illustrating a process of manufacturing a stack and folding type electrode assembly in an electrode assembly according to the related art.
Figure 2:
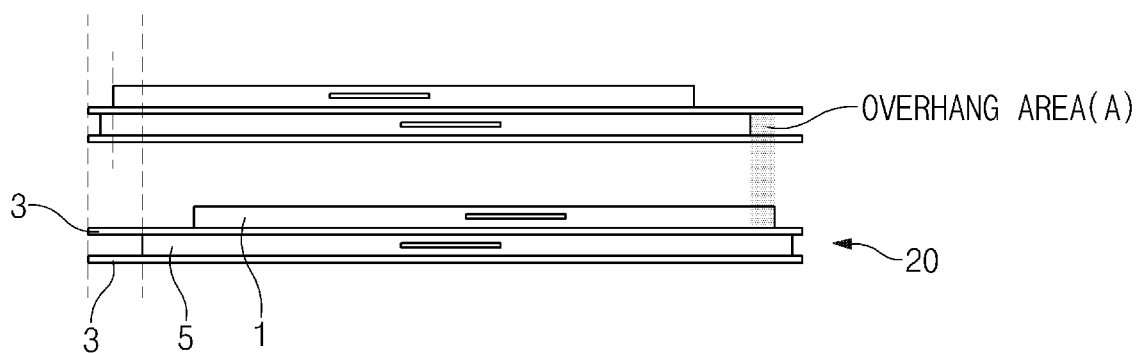
FIG. 2 is a cross-sectional view illustrating a stacked state of a lamination and stacking type electrode assembly.
Figure 3:
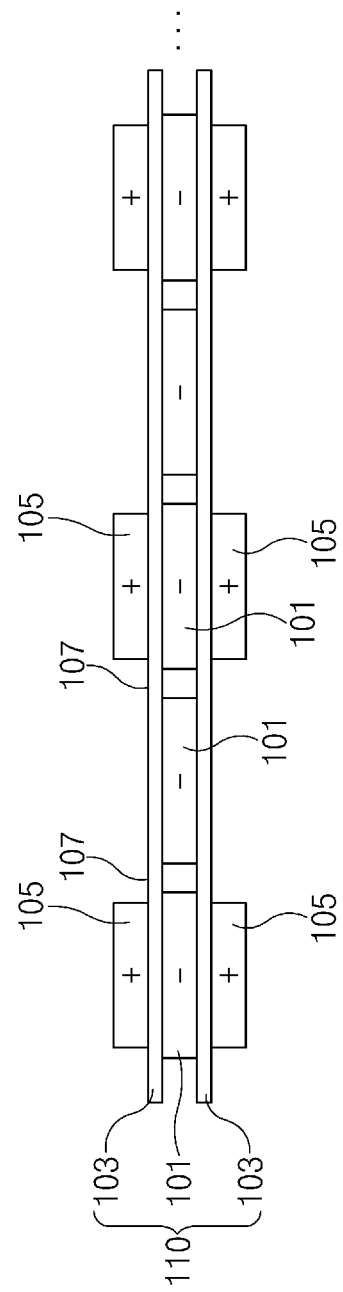
FIG. 3 is a cross-sectional view illustrating a state before the electrode assembly is folded according to an embodiment of the present invention.
Figure 4:
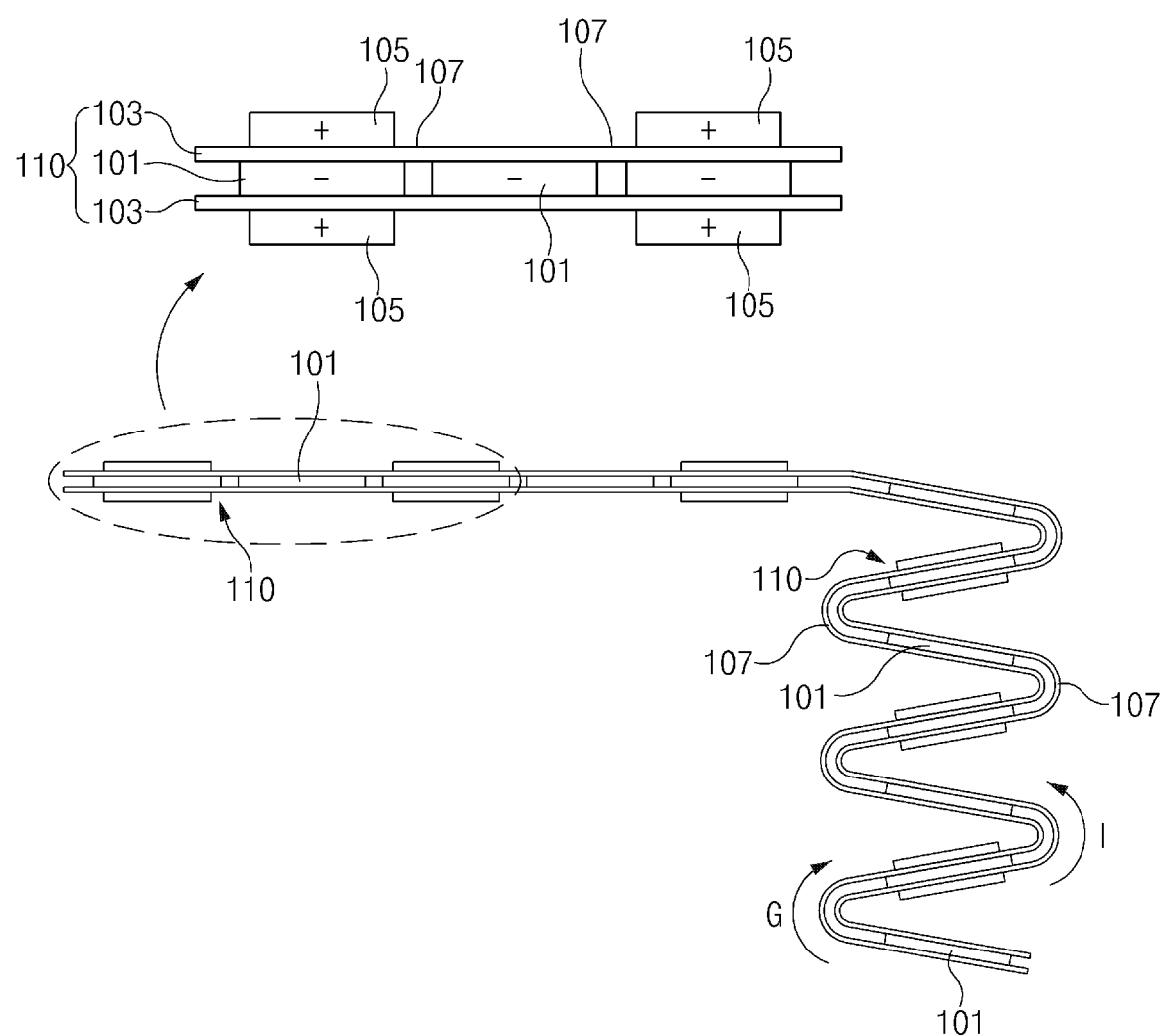
FIG. 4 is a cross-sectional view illustrating a state in which the electrode assembly is realized according to an embodiment of the present invention.
Figure 5:
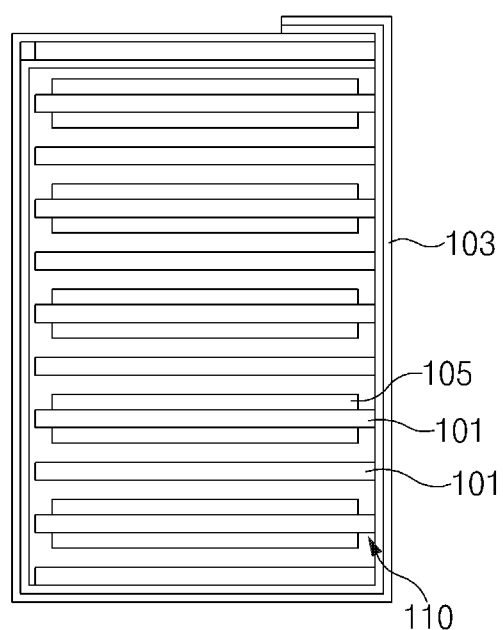
FIG. 5 is a cross-sectional view of the electrode assembly that is realized in FIG. 4 according to an embodiment of the present invention.

FIG. 3 is a cross-sectional view illustrating a state before the electrode assembly is folded according to an embodiment of the present invention. FIG. 4 is a cross-sectional view illustrating a state in which the electrode assembly is realized according to an embodiment of the present invention. FIG. 5 is a cross-sectional view of the electrode assembly that is realized in FIG. 4 according to an embodiment of the present invention.

Hereinafter, an electrode assembly according to an embodiment of the present invention will be described with reference to FIGS. 3 to 5.

Referring to FIG. 3, an electrode assembly according to an embodiment of the present invention may include an electrode stack 110 and a second electrode 105 attached to each of both surfaces of the electrode stack 110.

Particularly, the electrode stack 110 may have a shape in which a plurality of first electrodes 101 spaced apart from each other are disposed between two separators 103. Each of the two separators 103 may be a sheet type separator. The first electrodes 101 may be disposed to be spaced a predetermined distance from each other between the two separators 103.

In the electrode stack 110, the second electrodes 105 may be attached to both outer surfaces of the electrode stack 110 at alternate positions of the plurality of positions on which the first electrodes 101 are disposed. In this case, when the electrode assembly according to an embodiment of the present invention is divided at one position, the second electrode 105, the separator 103, the first electrode 101, the separator 103, and the second electrode 105 are sequentially stacked downward. Also, the separator 103, the first electrode 101, and the separator 103 are stacked at the adjacent position.

The first electrode 101 and the second electrode 105 may be electrodes having polarities opposite to each other. In an embodiment of the present invention, the first electrode 101 may be a negative electrode, and the second electrode 105 may be a positive electrode. FIG. 3 illustrates a case in which the first electrode 101 is a negative electrode, and the second electrode 105 is a positive electrode. In an embodiment of the present invention, the first electrode 101 may have a size greater than that of the second electrode 105.

In the electrode assembly according to an embodiment of the present invention, the two separators 103, the first electrode 101, and the second electrode 105 may be bonded to each other by the heat or the pressure. Alternatively, the two separators 103, the first electrode 101, and the second electrode 105 may be bonded to each other by all of the heat and the pressure. For this, a lamination process may be performed on the whole of the separators 103, the first electrode 101, and the second electrode 105.

Referring to FIG. 4, in an embodiment of the present invention, an area of the electrode stack 110 between the first electrode 101 and the adjacent first electrode 101 may be folded. Particularly, FIGS. 3 and 4 illustrate a folding part 107 at which the electrode stack 110 is folded. In an embodiment of the present invention, the electrode stack 110 includes a plurality of folding parts 107. Thus, the electrode stack 110 may be folded at the folding parts 107.

Also, the folding part 107 and the adjacent folding part 107 may be folded in directions opposite to each other. As a result, in the electrode assembly according to an embodiment of the present invention, the electrode stack 110 may be folded in a zigzag manner. The shape in which the electrode stack is folded in the zigzag manner is illustrated in FIG. 4.

Referring to FIG. 4, in the electrode assembly according to an embodiment of the present invention, the electrode stack 110 may be folded based on a size of the first electrode 101. This means that the electrode stack 110 is folded with respect to the electrodes having the same size. That is, since the first electrodes 101 are provided as one electrode, the first electrodes 101 may have the same size. When stacked with respect to the first electrode 101, a phenomenon in which tolerances of the different electrodes 101 and 105 and the separator 103 are accumulated may not occur.

Thus, the alignment of the electrode assembly may be improved to minimize overhang issue in which corresponding positions of the positive electrode and the negative electrode mismatch each other.

FIG. 5 is a cross-sectional view of the electrode assembly that is completely assembled according to an embodiment of the present invention. FIG. 5 illustrates a state in which the first electrode 101 and the second electrode 105 are vertically stacked in position. For convenience of illustration, a portion of the separator 103 connecting the electrode stacks to each other in the electrode assembly is omitted.

In the electrode assembly according to an embodiment of the present invention, the two separators 103 may extend to surround the outside of the folded electrode stack 110 (see FIG. 5). FIG. 5 illustrates a state in which the separator 103 surrounds a circumference of the folded electrode stack 110 once. As described above, when the electrode assembly is surrounded once by the separator 103, it may be very advantageous to maintain superior alignment of the electrode assembly.

Referring to FIG. 5, the two separators 103 may be bonded to each other by the heat or the pressure as a whole. Alternatively, in the electrode assembly according to an embodiment, the separators 103 may be attached to the outside of the folded electrode stack 110 through a hot-press sealing method. In this case, the alignment of the electrode assembly according to an embodiment of the present invention may be very good.

Referring to FIGS. 4 and 5, a method for manufacturing the electrode assembly according to an embodiment of the present invention will be described.

A method for manufacturing the electrode assembly according to an embodiment of the present invention includes a step of interposing first electrodes 101 electrodes 101 between two separators 103 so that the first electrodes 101 are spaced apart from each other to form an electrode stack 110, a step of stacking second electrodes 105 on both outer surfaces of the electrode stack 110 at alternate positions of the plurality of positions on which the first electrodes are disposed, a step of applying heat or a pressure to the separators 103 and the first and second electrodes 101 and 105 to be boned to each other, and a step of folding the electrode stack 110 at a folding part 107 that is an area between the first electrode 101 and the adjacent first electrode 101. In this case, the first electrode 101 may be a negative electrode, and the second electrode 105 may be a positive electrode.

Referring to FIG. 4, in the step of forming the electrode stack 110, the first electrode 101 may be put between the two separators 103 that are transferred by being wound by a reel (not shown). Also, the second electrodes 105 may be vertically put outside the two separators 103 at alternate positions. The electrode assembly formed as described above may be laminated. That is, the first electrode 101, the separator 103, and the second electrode 105 may be bonded to each other by the heat and the pressure.

In the step of folding the electrode stack 110, the electrode assembly bonded through the lamination may be folded at the folding part 107 in directions different from each other. That is, the electrode stack 110 may be folded in a zigzag manner. When one folding part 107 is folded in the one direction G, the adjacent folding part 107 may be folded in the other direction I (see FIG. 4). Also, in this case, the electrode stack 110 may be folded based on a size of the first electrode 101. When stacked as described above, since the positive electrode is not out of the negative electrode, the overhang issue does not occur.

Also, in aspect of facilities, although all of a lamination facility for manufacturing the unit cell and a folding facility for attaching the unit cell to the separator sheet to fold the resultant structure have to be installed in the related art, since the lamination process and the folding process are integrated into one process in the method for manufacturing the electrode assembly according to an embodiment of the present invention, the process of manufacturing the secondary battery may be more simplified.

The method for manufacturing the electrode assembly according to an embodiment of the present invention may further include a sealing step of surrounding the folded electrode stack 110 by using extending portions of the two separators 103. In the sealing step, the two separators 103 may be bonded to each other by the heat or the pressure. Also, in the sealing step, the two separators 103 may be attached to the outside of the folded electrode stack 110 by using a hot-press. In this case, the electrode assembly may be more improved in stability and efficiency.

Another Embodiment

Figure 6:
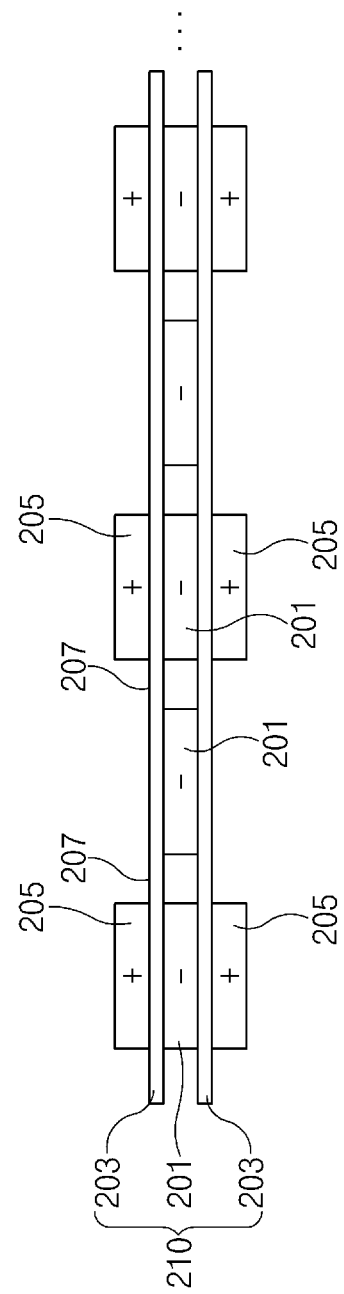
FIG. 6 is a cross-sectional view of an electrode assembly according to another embodiment of the present invention.

FIG. 6 is a cross-sectional view of an electrode assembly according to another embodiment of the present invention.

An electrode assembly according to another embodiment of the present invention has a structure similar to that of the electrode assembly according to the foregoing embodiment. However, another embodiment is different from the foregoing embodiment in that a second electrode has a different size.

For reference, the same (equivalent) component as that according to the foregoing embodiment is given by the same (equivalent) reference symbol, and thus, their detailed description will be omitted.

Referring to FIG. 6, in the electrode assembly according to another embodiment of the present invention, a second electrode 205 has a size corresponding to that of a first electrode 201. Preferably, the second electrode 205 may have the same size as the first electrode 201. The first electrode 201 may be a negative electrode, and the second electrode 205 may be a positive electrode.

In the electrode assembly according to another embodiment of the present invention, the positive electrode having the size corresponding to that of the negative electrode is because the positive electrode is not out of the negative electrode in the electrode assembly. That is, since there is no concern about the overhang issue in which the positive electrode is out of the negative electrode, the positive electrode may increase in size to realize the high-capacity battery.

While the embodiments of the present invention have been described with reference to the specific embodiments, it will be apparent to those skilled in the art that various changes and modifications may be made without departing from the spirit and scope of the invention as defined in the following claims.

DESCRIPTION OF SYMBOLS

1: Positive electrode
3: Separator
5: Negative electrode
9: Sheet type separator
10, 20: Unit cell
11: Stack and folding type electrode assembly
12: Lamination and stacking type electrode assembly
101, 201: First electrode
103, 203: Separator
105, 205: Second electrode
107, 207: Folding part
110, 210: Electrode stack

The invention claimed is:
1. An electrode assembly comprising:
an electrode stack in which a plurality of first electrodes are disposed between two separators, the plurality of first electrodes being spaced apart from each other in a length direction of the two separators; and
a plurality of pairs of second electrodes attached, each pair of second electrodes stacked overlying and laminated to a corresponding one of the first electrodes at opposite outer surfaces of the electrode stack at alternate positions of a plurality of positions on which the first electrodes are disposed, such that only every other one of the first electrodes is stacked with and laminated to one of the pairs of second electrodes, and each of the first electrodes is longer than each of the second electrodes in the length direction, wherein, in the electrode stack, folding parts of each of the two separators located between each of the first electrodes and a respective one of the first electrodes that is immediately adjacent thereto are folded, such that when the electrode stack is in a folded position, opposite ends of all of the first electrodes extend beyond opposite ends of all of the second electrodes in the length direction.

2. The electrode assembly of claim 1, wherein the separators, the first electrodes, and the second electrodes are bonded to each other by heat or a pressure.

3. The electrode assembly of claim 1, wherein each of the first electrodes is a negative electrode, and each of the second electrodes is a positive electrode.

4. The electrode assembly of claim 1, wherein each of the folding parts of each of the two separators and a respective one of the folding parts that is immediately adjacent thereto are folded in folding directions opposite to each other.

5. The electrode assembly of claim 4, wherein the electrode stack is folded in a zigzag manner.

6. The electrode assembly of claim 4, wherein the electrode stack is folded to have a width based on a size of each of the first electrodes.

7. The electrode assembly of claim 4, wherein each of the second electrodes has a size corresponding to that of the respective one of the first electrodes that is disposed immediately adjacent thereto.

8. The electrode assembly of claim 1, wherein the two separators extend to surround the outside of the folded electrode stack.

9. The electrode assembly of claim 8, wherein the two separators are bonded to each other by heat or a pressure.

10. A method for manufacturing an electrode assembly, the method comprising:

a step of interposing a plurality of first electrodes between two separators so that the first electrodes are spaced apart from each other to form an electrode stack, the plurality of first electrodes being spaced apart from each other in a length direction of the two separators;

a step of stacking a plurality of pairs second electrodes on opposite outer surfaces of the electrode stack at alternate positions of a plurality of positions of the first electrodes, each pair of second electrodes stacked overlying a corresponding one of the first electrodes at the opposite outer surfaces of the electrode stack, such that only every other one of the first electrodes is stacked with one of the pairs of second electrodes, and each of the first electrodes is longer than each of the second electrodes in the length direction;

a step of laminating the separators, the first electrodes, and the second electrodes to each other by heat or a pressure; and a step of folding the electrode stack at folding parts of each of the two separators located between each of the first electrodes and a respective one of the first electrodes that is immediately adjacent thereto, such that when the electrode stack is in a folded position, opposite ends of all of the first electrodes extend beyond opposite ends of all of the second electrodes in the length direction.

11. The method of claim 10, wherein, in the step of folding the electrode stack, a folding part and an adjacent folding part, which are portions to be folded, are folded in directions opposite to each other.

12. The method of claim 11, wherein, in the step of folding the electrode stack, the electrode stack is folded in a zigzag manner.

13. The method of claim 11, wherein the electrode stack is folded to have a width based on a size of each of the first electrodes.

14. The method of claim 10, further comprising a sealing step of surrounding the folded electrode stack by using extending portions of the two separators.

15. The method of claim 14, wherein, in the sealing step, the two separators are bonded to each other by heat or a pressure.

16. The method of claim 14, wherein, in the sealing step, the two separators are attached to the outside of the folded electrode stack by using a hot-press.

* * * * *